(12) United States Patent
Swindell

(10) Patent No.: US 12,468,319 B2
(45) Date of Patent: Nov. 11, 2025

(54) PRESSURE REGULATOR VALVE WITH INCREMENTAL PRESSURE ADJUSTMENTS

(71) Applicant: Jeffrey Lee Swindell, Bartlett, TN (US)

(72) Inventor: Jeffrey Lee Swindell, Bartlett, TN (US)

(*) Notice: Subject to any disclaimer, the term of this patent is extended or adjusted under 35 U.S.C. 154(b) by 123 days.

(21) Appl. No.: 18/530,705

(22) Filed: Dec. 6, 2023

(65) Prior Publication Data

US 2024/0184316 A1 Jun. 6, 2024

Related U.S. Application Data

(60) Provisional application No. 63/430,564, filed on Dec. 6, 2022, provisional application No. 63/430,570, filed on Dec. 6, 2022.

(51) Int. Cl.
| | |
|---|---|
| *G05D 16/06* | (2006.01) |
| *F16K 17/04* | (2006.01) |
| *F16K 17/06* | (2006.01) |
| *F16K 27/02* | (2006.01) |

(52) U.S. Cl.
CPC .......... *G05D 16/06* (2013.01); *F16K 17/0406* (2013.01); *F16K 27/0209* (2013.01); *F16K 17/06* (2013.01); *Y10T 137/7878* (2015.04)

(58) Field of Classification Search
CPC ............................ F16K 17/06; Y10T 137/7878
See application file for complete search history.

(56) References Cited

U.S. PATENT DOCUMENTS

| | | | |
|---|---|---|---|
| 1,457,544 A * | 6/1923 | Myers | F16K 31/52425 137/530 |
| 2,075,458 A | 3/1937 | Parker | |
| 2,521,166 A * | 9/1950 | Hinrichs | F16K 17/06 137/530 |
| 2,587,421 A * | 2/1952 | Willach | A47J 27/09 137/530 |
| 2,696,219 A | 12/1954 | Barksdale | |
| 2,983,266 A | 5/1961 | Wallman | |
| 3,105,476 A | 10/1963 | Gdovin et al. | |
| 3,386,428 A | 6/1968 | Slabey et al. | |
| 4,243,155 A | 1/1981 | Stewart | |
| 5,368,058 A | 11/1994 | Gold et al. | |

(Continued)

FOREIGN PATENT DOCUMENTS

| | | |
|---|---|---|
| DE | 102014201735 A1 | 8/2015 |
| GB | 1429132 A | 3/1976 |

*Primary Examiner* — Robert K Arundale
(74) *Attorney, Agent, or Firm* — Nath, Goldberg & Meyer; Joshua B. Goldberg

(57) ABSTRACT

A pressure regulating valve includes a housing defining a fluid passage between at least one inlet and one outlet. A ball valve is positioned within the fluid passage and biased by a spring. A cam is in biased engagement with the spring and ball valve to regulate pressure of fluid passing through the fluid passage. The cam includes multiple faces, each face milled to a different depth, and means for adjusting a position of the cam relative to the ball valve, such that a different face of the cam enters into biased engagement with the spring of the ball valve, thereby altering a compression force exerted by the spring on the ball valve. The faces of the cam correspond to increments of desired pressure adjustment, such that rotation or movement of the cam surface between different faces results in discrete changes to the pressure of fluid passing through the valve.

9 Claims, 4 Drawing Sheets

(56) References Cited

U.S. PATENT DOCUMENTS 6,019,115 A * 2/2000 Sanders ................ F16K 17/30
                                                    137/460
7,299,824 B2   11/2007 Golan et al.

* cited by examiner

PRESSURE REGULATOR VALVE WITH INCREMENTAL PRESSURE ADJUSTMENTS

CROSS-REFERENCE TO RELATED APPLICATIONS

This application claims the benefit of U.S. Provisional Patent Application No. 63/430,564, filed on Dec. 6, 2022, and U.S. Provisional Patent Application No. 63/430,570 filed on Dec. 6, 2022.

BACKGROUND

Field

The disclosure herein relates to pressure regulator valves, and particularly to a pressure regulating valve having a cam surface allowing for desired incremental changes in pressure through the valve.

Description of Related Art

In auto racing, fuel pressure is a critical aspect of optimizing engine performance. By adjusting fuel pressure, the correct amount of fuel may be delivered to the combustion chamber, promoting optimal combustion, which can enhance power output and overall engine efficiency. Under different racing conditions, such as varying track layouts, elevations, and ambient temperatures, changes to the air density may occur which consequently affects the air-fuel ratio to the engine required for optimal performance. Adjusting fuel pressure allows racers to fine-tune an engine to adapt to changing conditions, thereby optimizing performance for a specific environment.

Typical fuel pressure regulator valves include a diaphragm and an adjustment screw. By turning an adjustment screw, the flexible diaphragm changes position causing a fluid passage to be smaller or larger, thereby resulting in a larger or smaller fuel pressure passing through. The problem with typical regulator valves using a diaphragm is that they must typically be removed from the fuel manifold system and attached to a flow meter in order to ensure a precise fuel pressure adjustment has been reached. This involves using tools to physically remove the valve from the engine, place the valve in connection with a flow meter, adjust the valve to the correct pressure, then re-attached the valve back into the fuel manifold circuit.

A need therefore exists for a pressure regulator valve which would not need to be removed from the engine and fuel manifold assembly while still allowing for precision adjustments to be made. There is also a need for a pressure regulator valve where the adjustments could be made in known pressure increments depending on the conditions of a given race.

Thus, a pressure regulator valve solving the aforementioned problems is desired.

SUMMARY OF THE INVENTION

The pressure regulating valve disclosed herein includes a housing defining a fluid passage between at least one inlet and one outlet. A ball valve is positioned within the fluid passage and biased by a spring. A cam is in biased engagement with the spring and ball valve to regulate pressure of fluid passing through the fluid passage. The cam includes multiple faces, each face milled to a different depth, and means for adjusting a position of the cam relative to the ball valve, such that a different face of the cam enters into biased engagement with the spring of the ball valve, thereby altering a compression force exerted by the spring on the ball valve.

Furthermore, the multiple faces of the cam correspond to predetermined increments of desired pressure adjustment, such that rotation or movement of the cam surface between different faces results in discrete changes to the pressure of fluid passing through the valve. One or more detents are included as well as a spring biased member between the housing and cam, allowing the cam to be locked into different incremental adjustments corresponding to the different cam faces engaged with the ball valve.

In an embodiment, the cam is in the form of a shaft wherein the multiple faces are milled around a central axis, and wherein the spring of the ball valve is biased by a force perpendicular to a longitudinal axis of the shaft.

In another embodiment, the cam is a rotary wheel and the multiple cam faces are milled onto a planar surface of the rotary wheel, such that the spring of the ball valve is biased by a force acting in a direction parallel to an axis of rotation of the rotary wheel.

In an embodiment, the pressure regulating valves disclosed herein are used in a high-performance internal combustion engine.

In another embodiment, a method of manufacturing a pressure regulating valve is provided. The method includes milling a plurality of faces in a cam, wherein the faces are milled to depths according to desired shifts in pressure for a fluid passing through the pressure regulating valve.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Figure 1A:
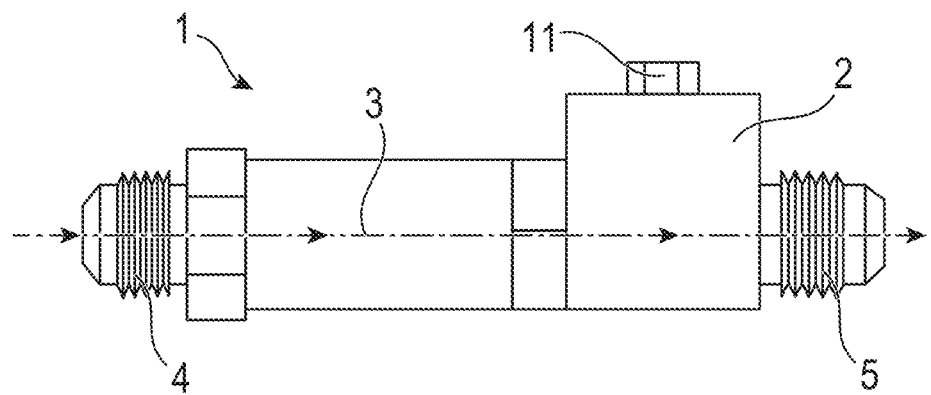
FIG. 1A is a side view of an assembled pressure regulator valve according to a first embodiment.
Figure 1B:
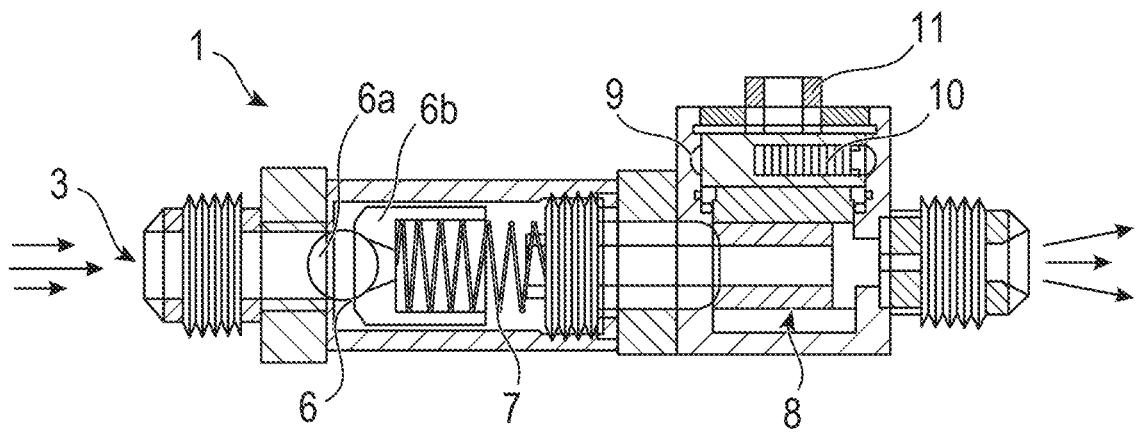
FIG. 1B is a side cutaway view of an assembled pressure regulator valve according to a first embodiment.
Figure 1C:
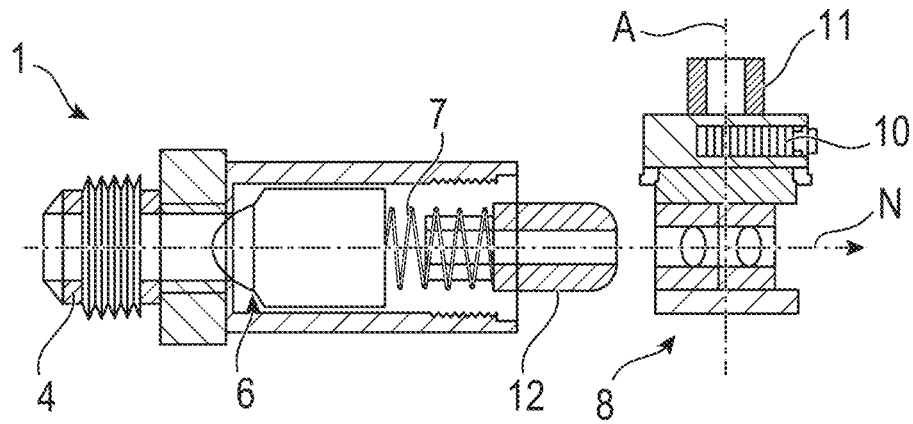
FIG. 1C is a partial cutaway side view of a pressure regulator valve according to a first embodiment.

An example pressure regulating valve assembly 1, shown in FIGS. 1A-E and FIG. 2, includes a housing 2 defining a fluid passage 3 between at least one inlet 4 and one outlet 5. A ball valve 6, made up of ball 6a and hollow ball follower 6b is positioned within the fluid passage 3 and biased by a spring 7. A cam 8 and hollow cam follower 12 are in biased engagement with spring 7 and ball valve 6 to regulate pressure of fluid passing through the fluid passage 3. The cam 8 includes multiple faces F, each face milled to a different depth D, and means 11, shown as a hexagonal head (also referred to as hex, hex head), for adjusting a position of the cam 8 relative to the ball valve 6, such that a different face F of the cam enters into biased engagement with the spring 7 of the ball valve 6, thereby altering a compression force exerted by the spring on the ball valve 6.

Furthermore, the multiple faces F of the cam 8 correspond to predetermined increments of desired pressure adjustment, for example 2 psi, 5 psi, 10 psi, etc. Rotation or movement of the cam 8 between different faces F results in discrete changes to the pressure of fluid passing through the valve assembly 1. One or more detents 9 are included as well as a spring biased member 10 between the housing 2 and cam 8, allowing the cam 8 to be locked into different incremental adjustments corresponding to the different cam faces F engaged with the ball valve 6.

In the embodiment of FIGS. 1A-E, the cam 8 is in the form of a shaft 100 having respective relief ports 102 beneath the multiple faces F placed around a longitudinal axis A (See FIG. 1D, 1E, FIG. 2) through the center of shaft 100. The spring 7 of ball valve 6 is biased by a force N perpendicular to longitudinal axis A of the shaft 100 (see FIG. 1C).

Figure 2:
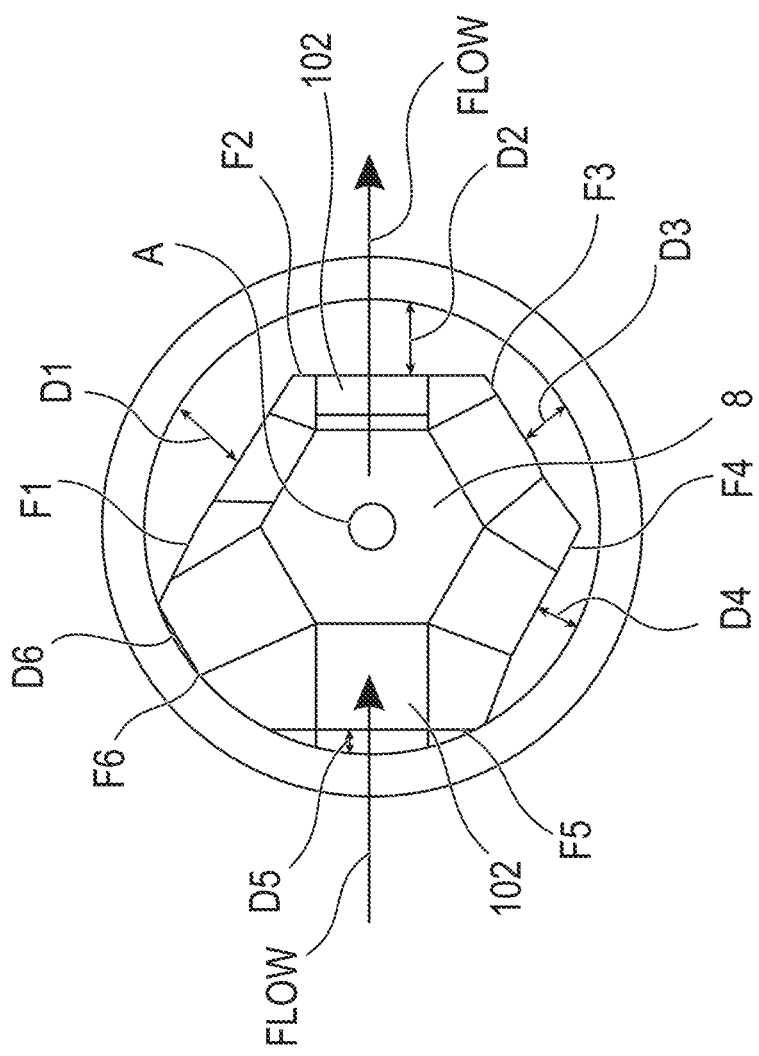
FIG. 2 is a closeup top view of a cam of a pressure regulator valve according to a first embodiment.
Figure 1D:
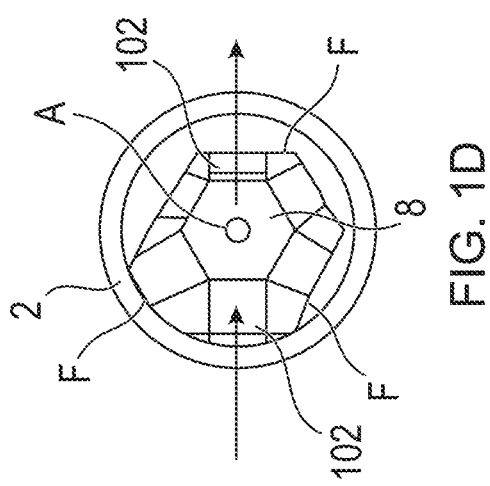
FIG. 1D is a top view of a cam of a pressure regulator valve according to a first embodiment.
Figure 1E:
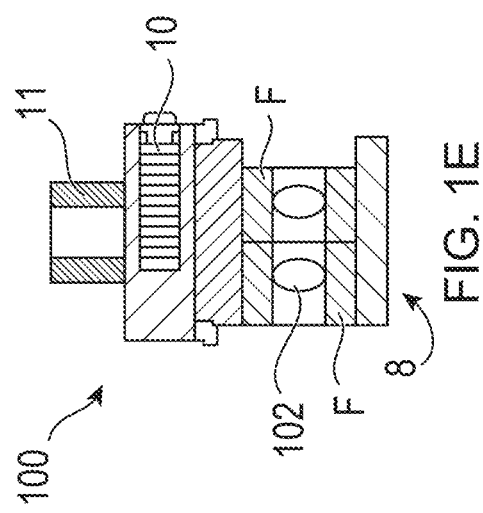
FIG. 1E is a side view of a cam of a pressure regulator valve according to a first embodiment.

As shown in closer detail in FIG. 2, cam 8 is milled to six different depths D1-D6 on respective faces F1-F6. Cam 8 may be rotated with a tool at hex head 11 to adjust between different faces F1-F6 and provide adjustments in the compressive force acting on spring 7 and therefore allowing for different pressures of fluid through passage 3. In the embodiment of FIGS. 1A-E and FIG. 2, the cam faces with a smaller distance would cause a greater compressive force on spring 7, therefore requiring a greater pressure exerted on ball valve 6 for fluid passing through the valve assembly.

An important aspect of the cam 8 is that the different depths D1-D6 on faces F1-F6 may be milled upon manufacturing such that when each face enters into engagement with the ball valve 6, a corresponding change in pressure is produced through the valve assembly. Unlike prior fuel adjustment valves, the pressure valve 1 may be adjusted without requiring removal from a fuel injection circuit, by simply using a tool such as a hex wrench on hex head 11 to make an incremental adjustment in pressure.

Figure 3C:
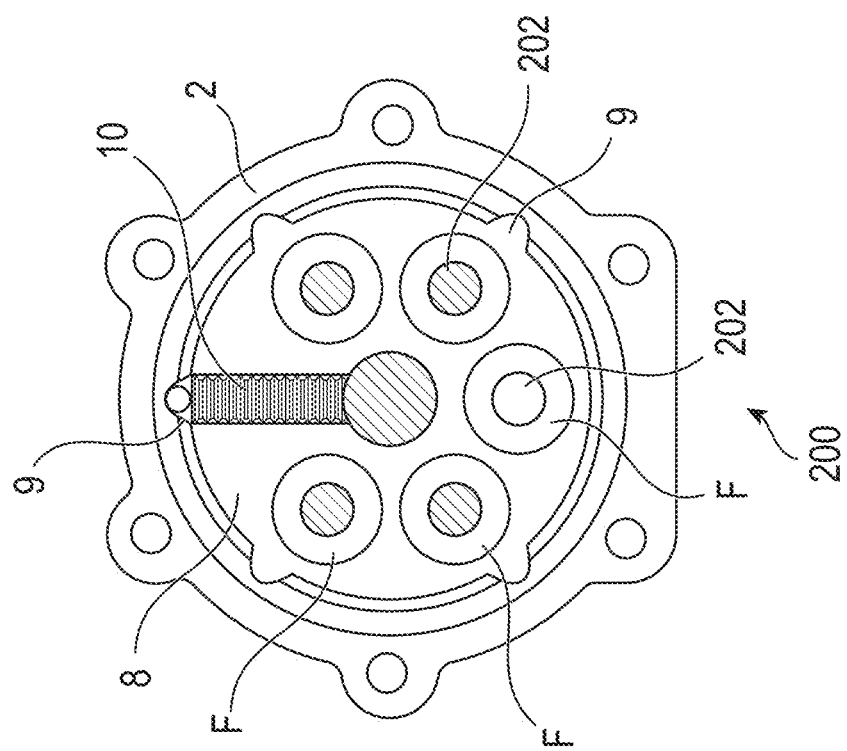
FIG. 3C is a front cutaway view of a pressure regulator valve according to a second embodiment.
Figure 3A:
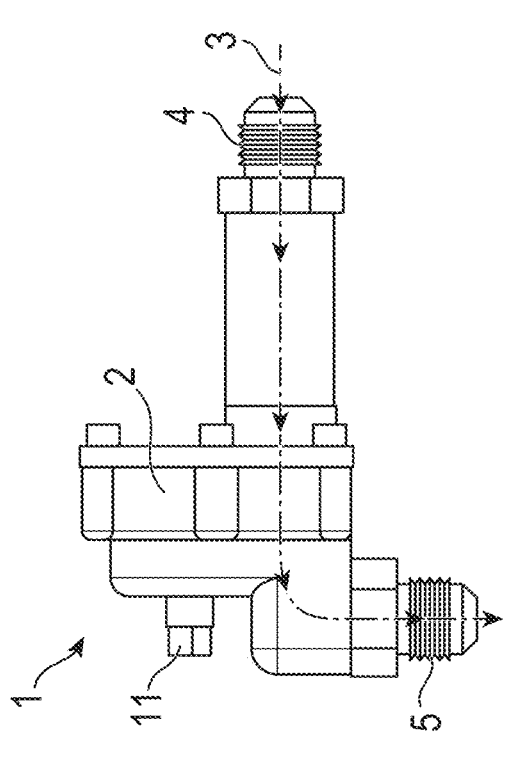
FIG. 3A is a side view of a pressure regulator valve according to a second embodiment.
Figure 3B:
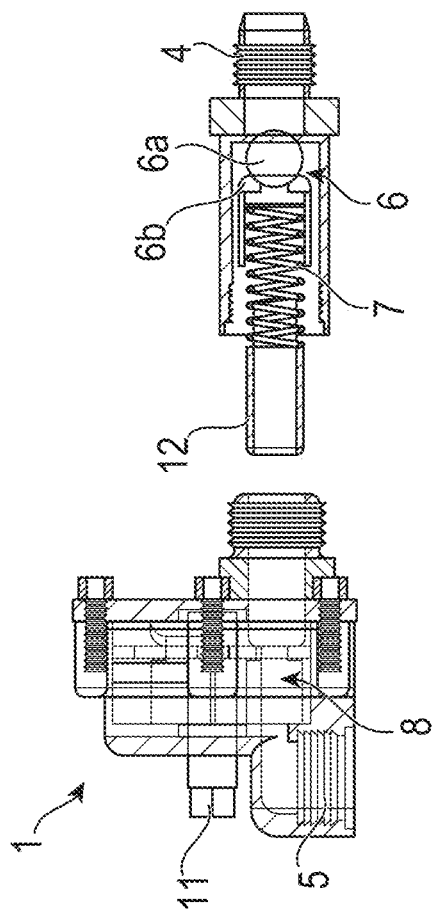
FIG. 3B is a side cutaway view of a pressure regulator valve according to a second embodiment.
Figure 4:
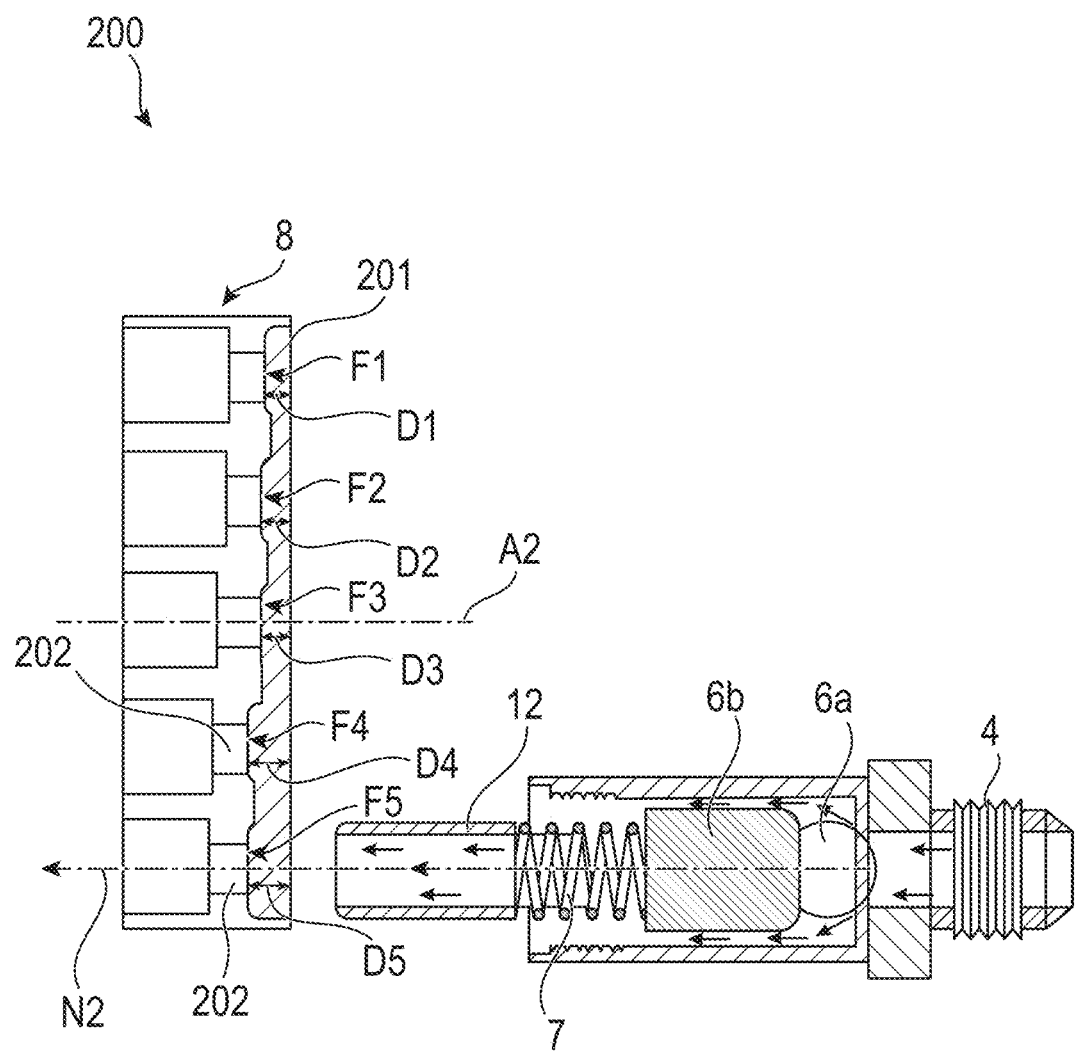
FIG. 4 is a closeup side cutaway view of a pressure regulator valve according to a second embodiment.

In another embodiment, shown in FIGS. 3A-B and FIG. 4, cam 8 is a rotary wheel 200 having respective relief ports 202 beneath multiple cam faces F1-5 milled onto a planar surface 201 of the rotary wheel 200, such that the spring 7 of the ball valve 6 is biased by a force N2 acting in a direction parallel to an axis A2 of rotation of the rotary wheel 200 (See FIG. 4). It should be understood, that the figures are not to scale and are meant to be exemplary only, for purposes of explaining the concepts discussed herein. Similarly to the previous embodiment, the cam faces with a smaller distance would cause a greater compressive force on spring 7, therefore requiring a greater pressure exerted on ball valve 6 for fluid passing through the valve assembly In another embodiment, a method of manufacturing the pressure regulating valve is provided, wherein the method includes milling a plurality of cam faces in a cam, wherein the cam faces are milled to depths according to desired shifts in pressure of the fluid passing through the pressure regulating valve.

An important aspect of the pressure regulator valve assembly is that any suitable increments in pressure adjustment may be provided by the different faces of the cam. For example, an increase of 2 psi/face, 5 psi/face, or 10 psi/face may be provided as determined during the manufacturing stage of the pressure regulator valve assemblies. Also, different increments may be used for different faces upon manufacturing, if desired. For example faces F1, F2, F3 could provide incremental adjustments of 5 psi, with each turn of hex 11, while faces F4, F5 could be milled upon manufacturing to provide incremental adjustments of 2 psi or 10 psi with a corresponding turn of hex 11, depending on the milled depth of the faces. By the terms 'incremental' pressure adjustment, 'discrete' pressure adjustment, or pressure 'jump' as used herein, these terms signify that adjustments to the fuel pressure are not continuous but rather occur in specific quantities by a switch between different cam faces. An example shift in pressure from face F1 to F2 of 30 and 35 psi, respectfully, would be an incremental shift, or 'jump' of 5 psi. This is a significant difference between conventional diaphragm valves whereby the adjustment occurs in a continuous manner where a turn of an adjustment screw results in an unknown shift in pressure, where there are no known 'jumps' or incremental shifts of known quantity between various pressure levels.

During the manufacturing stage, any suitable milling machine may be used to form the faces F in cam 8. However, an exemplary machine used would be a computer numerical control (CNC) milling machine. Advantageously, the pressure regulator valve assemblies disclosed herein provide predetermined incremental adjustments in pressure, whereby the cam may be adjusted to a predetermined increase or decrease in pressure, with each turn or movement of the adjusting means (such as a hex tool, wrench, or other), and without the need to remove the entire valve assembly and connect it to a flow meter for adjustment (a necessity of typical diaphragm valves used in the prior art). By using such a valve assembly disclosed herein for vehicles such as racing cars, drivers and crew members save significant amounts of time in making necessary pressure adjustments to achieve optimal fuel/air ratios reaching the engine.

It is to be understood that the pressure regulator valve is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A pressure regulating valve comprising: a housing defining a fluid passage between at least one inlet and one outlet; a ball valve positioned within the fluid passage and biased by a spring; a cam in biased engagement with the spring and ball valve to regulate pressure of fluid passing through the fluid passage, wherein the cam includes multiple faces, each face milled to a different depth, wherein the fluid passage extends through the cam, and means for adjusting a position of the cam relative to the ball valve, such that a different face of the cam enters into biased engagement with the spring of the ball valve thereby altering a compression force exerted by the spring on the ball valve.

2. The pressure regulating valve as recited in claim 1, wherein the multiple faces of the cam correspond to predetermined increments of desired pressure adjustment, such that rotation or movement of the cam between different faces results in discrete changes to pressure of fluid passing through the pressure regulating valve.

3. The pressure regulating valve as recited in claim 2, further comprising one or more detents and a spring biased member within the one or more detents, wherein the spring is in biased engagement between the housing and the cam.

4. The pressure regulating valve as recited in claim 3, wherein said cam is a shaft having multiple faces milled around a longitudinal axis.

5. The pressure regulating valve as recited in claim 4, wherein the spring of the ball valve is biased by a force from the cam that is perpendicular to a longitudinal axis of the shaft.

6. The pressure regulating valve as recited in claim 3, wherein said cam is a rotary wheel and wherein the multiple faces are milled onto a planar surface of the rotary wheel.

7. The pressure regulating valve as recited in claim 6, wherein the spring of the ball valve is biased by a force from the cam acting in a direction parallel to an axis of rotation of the wheel.

8. A vehicle having an internal combustion engine and a fuel manifold using the pressure regulating valve of claim 1.

9. A method of manufacturing the pressure regulating valve of claim 1, wherein the method includes:
   milling a plurality of faces in the cam, wherein the faces are milled to depths according to desired shifts in pressure for the fluid passing through the pressure regulating valve.

\* \* \* \* \*